United States Patent [19]

Chierici, deceased

[11] E Patent Number: Re. 33,667

[45] Reissued Date of Patent: Aug. 20, 1991

[54] TELESCOPING UNCOUPLING LEVER

[75] Inventor: Osvaldo F. Chierici, deceased, late of Geneva, Ill., by Penny Chierici, administratrix

[73] Assignee: Railroad Equipment Supply Co., Belleville, Mich.

[21] Appl. No.: 829,798

[22] Filed: Feb. 14, 1986

Related U.S. Patent Documents

Reissue of:

[64] Patent No.: 4,454,953
Issued: Jun. 19, 1984
Appl. No.: 365,968
Filed: Apr. 6, 1982

U.S. Applications:

[63] Continuation-in-part of Ser. No. 330,391, Dec. 14, 1981, abandoned.

[51] Int. Cl.[5] ..... B61G 1/04; B61G 3/26

[52] U.S. Cl. ..... 213/166; 213/162; 213/219

[58] Field of Search ..... 213/162, 166, 167, 169, 213/170, 159, 211, 213, 217, 218, 219

[56] References Cited

U.S. PATENT DOCUMENTS

| | | | |
|---|---|---|---|
| 1,926,117 | 9/1933 | Small | 213/167 |
| 1,972,940 | 9/1934 | Kinne | 213/167 |
| 3,127,997 | 4/1964 | Lahey | 213/166 |
| 3,227,289 | 1/1966 | Cseri | 213/219 |
| 3,232,444 | 2/1966 | Halon | 213/166 |
| 3,239,074 | 3/1966 | Boone et al. | 213/211 |
| 3,239,075 | 3/1966 | Schmitz et al. | 213/211 |
| 3,258,133 | 6/1966 | Hawkins | 213/219 |
| 3,568,858 | 3/1971 | Manyek | 213/166 |
| 3,762,575 | 10/1973 | Cseri | 213/166 |
| 3,814,267 | 6/1974 | Chierici | 213/166 |
| 3,834,554 | 9/1974 | Chierici | 213/166 |
| 3,933,252 | 1/1976 | Murphy et al. | 213/166 |
| 4,010,854 | 3/1977 | Manyek | 213/166 |
| 4,378,890 | 4/1983 | Empson | 213/166 |

OTHER PUBLICATIONS

The Car and Locomotive Cyclopedia of American Practice, 4th Edition, 1980, Simmon-Boardman Publishing Co., Omaha, Neb., pp. 502-506.

*Primary Examiner*—Margaret A. Focarino
*Assistant Examiner*—Joseph D. Pape
*Attorney, Agent, or Firm*—Weiser & Stapler

[57] ABSTRACT

A three-part telescoping uncoupling lever assembly is disclosed for railroad cars which are equipped with standard draft gear cushioning. The assembly includes a plastic sleeve formed from ultrahigh molecular weight polyethylene (U.H.M.W.) and a pair of unitary extension bars in sliding engagement within the sleeve. One end of each extension bar is bent to form a lock lifter hook or a handle for performing the uncoupling function. Each extension bar includes a shaft and an integral bent retainer, the bent retainers being positioned within the sleeve. The retainers are maintained in parallel sliding arrangement within juxtaposed channels extruded in the U.H.M.W. polyethylene sleeve. The hook and the handle are located on opposite ends of the assembly, the total length of which can be varied automatically between maximum and minimum lengths, dependent upon the corresponding distance between the coupler and sill bracket as that distance changes due to coupler impact and side swing. The assembly includes a pair of pins secured across respective channels to engage the bent retainers to prevent the extension bars from sliding free of the sleeve.

20 Claims, 2 Drawing Sheets

FIG. 1
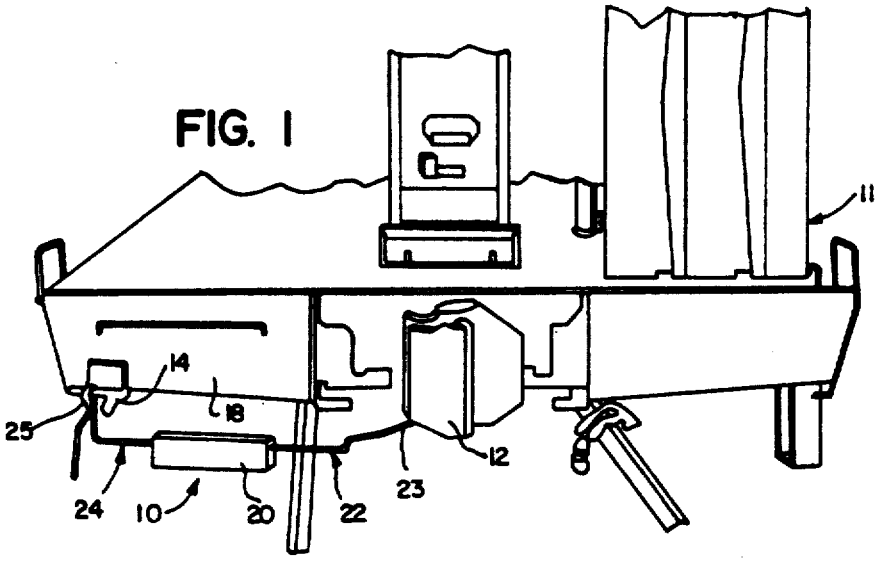
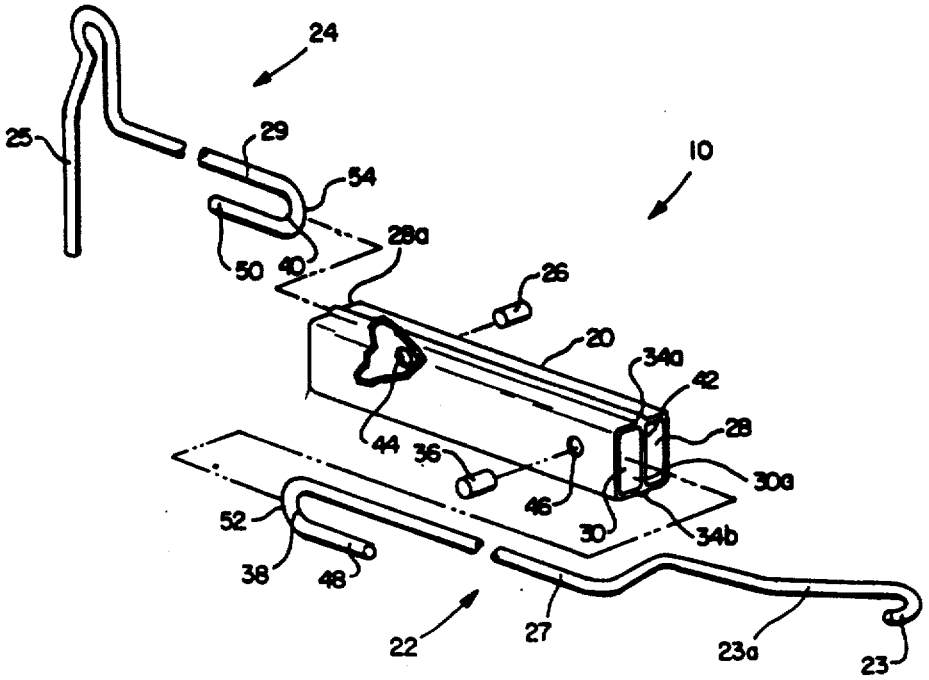
FIG. 2

TELESCOPING UNCOUPLING LEVER

Matter enclosed in heavy brackets [ ] appears in the original patent but forms no part of this reissue specification; matter printed in italics indicates the additions made by reissue.

RELATED APPLICATION

This application is a continuation-in-part of my earlier filed application entitled "Telescopic Uncoupling Lever," Ser. No. 330,391, filed Dec. 14, 1981, and now abandoned.

BACKGROUND OF THE INVENTION

This invention relates to an uncoupling lever for railroad cars, and more particularly, to an improved uncoupling lever assembly especially adapted for use with TTX (or trailer on flat car) type flatcars, end of car and sliding sill cars.

Conventional operating levers for cars equipped with standard draft gear cushioning have usually included a rigid operating rod which neither expands nor contracts, and which accomodates coupler side swing by allowing the handle to float freely relative to the car body. This arrangement is dangerous inasmuch as workers have been pulled between cars by the handle which has been known to unexpectedly swing outwardly of the car body during uncoupling if the coupler happens to swing away from the body bracket.

In U.S. Pat. No. 3,834,554, the present application improved upon the prior art type of conventional uncoupling lever assembly by replacing the usual rigid rod with a pair of telescoping bars which were secured in sliding arrangement by a metal channel member welded to one of the bars and through which the other was free to slide. To enable the metal bars to slide against each other, it was the usual practice to grease the mating ends of the respective bars. Although the improved device eliminated the safety hazard created by the floating handle, the additional danger to workers of slipping off the greased portion of the lever while effecting other end-of-car maintenance remained.

There were other problems attendant with conventional assemblies which have persisted despite applicant's improvements as above noted. Because the devices were in constant contact with the elements the ferrous members were prone to rust. More seriously, in cold weather, water in and on the lever assembly would freeze, immobilizing the telescopic parts of the lever and making uncoupling that much more difficult. Force exerted by the freezing water as it expanded within the open parts of the assembly also contributed to the difficulties encountered during winter operation.

In the above mentioned parent application, the applicant has disclosed an uncoupling lever comprising a first handle section for attachment to a bracket affixed to the sill of a railroad car, and a second hook section including a hook or an eye adapted for functional application to the lock lifter of the car coupler. The hook and handle are located at opposite ends of the assembly in the usual manner, each being attached to the remote end of a steel tube or bar. The steel tubes are arranged in parallel sliding arrangement, within respective channels of a bi-channel, polyethylene plastic sleeve. The combined length of the tubes and the sleeve must be at least equal to the distance between the coupler and bracket when those parts are spaced farthest apart due to coupler impact and side-swing. The length of the assembly when both tubes have telescoped into the sleeve is designed to be small enough to accommodate the minimum possible distance between the coupler and the hook bracket. Thus the length of the three parts may vary widely within the set parameters. Preferably, a tri-slide arrangement is provided to permit an extension of eighty and one-half inches and a closure of thirty-seven inches to meet all field conditions for encoupling a freight car.

Still referring to the parent application, the sleeve is fabricated, preferably by extrusion, of ultra high molecular weight (U.H.M.W.) polyethylene, to a configuration containing two channels shaped to conform to the cross-sectional shape of the steel bars or tubes from the ends of which either a hook or a handle is respectively attached. An optional communicating space may be defined in the divider between the channels which has the double advantage of providing a run-off space for water and of allowing the sleeve to be produced by using a smaller quantity of polyethylene. The applicant's use of U.H.M.W. polyethylene for the sleeve solves several of the difficulties inherent in the prior art. Polyethylene is a naturally slippery material and thus has self lubricating characteristics and requires no additional lubrication to enable a metal tube to slide against it. Additionally, the slippery nature of U.H.M.W. polyethylene prevents the adhesion or build up of accumulations of ice. Consequently the three parts can slide freely relative to one another without the application of grease, and unimpeded by the presence of ice during the winter months. Additionally, polyethylene cannot rust, thereby eliminating rust-related difficulties which have been experienced with prior art metallic sleeve constructions.

Applicant's present invention constitutes an improvement over the invention of the parent application, solving major difficulties of the prior art in much the same way while being more easily and thus more inexpensively manufactured.

SUMMARY OF THE INVENTION

The improved coupling lever of the present invention is designed particularly for use in railroad cars of the type having couplers capable of side to side swinging movement and which employ lock lifters for uncoupling the coupler. Instead of utilizing a separate lock lifter tube or a separate handle tube that must be welded or otherwise affixed to bars, the assembly includes a unitary lock lifter extension bar including a hook at one end adapted to operably engage the lock lifter or uncoupling knuckle and a unitary handle extension bar including a handle at one end adapted to be pivotally secured to the uncoupling lever bracket which is affixed to the car. The two extension bars are in sliding telescoping engagement with each other within respective, juxtaposed, separate channels which are extruded or otherwise formed in a plastic sleeve.

The advantage of the present construction arises from the fact that each of the two extension bars, both lock lifter and handle, are of unitary or one piece construction and may be easily fashioned by bending a length of metal rod. The lock lifter member and the handle members are of conventional size and shape and the transverse cross-sectional dimensions of the extension bars are designed to slideably fit within one of the sleeve channels. The combined length of the two extension bars and the sleeve must be such to accommodate the minimum and maximum distances possible between the coupler and sill bracket as that distance changes due to coupler impact and side swing. Because these minimum and maximum distances vary between approximately thirty-seven inches and eighty one inches, to insure proper telescoping, no one part of the assembly should exceed thirty-seven inches in length.

Telescoping occurs because the extension bars are each placed in paarallel sliding arrangement within the sleeve, each within its own sleeve channel. The lock lifter and the handle are attached to the car end sill and coupler, respectively in the known manner. As the coupler moves in and out of the coupler shaft, or back and forth as when the train rounds a bend, the extension bars are arranged to slide into the sleeve when the coupler-end sill distance decreases, and to extend from the sleeve when that same distance increases.

The extension bars are prevented from sliding free of the sleeve by a sturdy plastic pin which is inserted through the sleeve material near the end of each channel after the parts are assembled. As the telescoping uncoupling lever reaches the maximum extension point, the bent ends of each extension bar will engage its pin and thereby prevent disassociation of the parts.

A principal object of this invention is to provide a telescoping uncoupling lever that automatically compensates for coupler sideswing by providing for extension and contraction of the effective length of the assembly in response to coupler movement.

It is another object of the present invention to provide a novel telescoping uncoupling lever which requires no lubrication intermediate its moving parts.

It is another object of the present invention to provide an uncoupling lever assembly which is substantially immune to the elements, and which is unaffected either by rust or by freezing.

It is another object of the present invention to provide a novel uncoupling lever which employs unitary or one piece, elongage components and which does not require welding as a step in its manufacture.

It is another object of the present invention to provide a novel telescoping uncoupling lever assembly for railroad cars that is economical in manufacture, rugged in design, and trouble-free in operation.

Other objects and a fuller understanding of the invention will be had by referring to the following description and claims of a preferred embodiment, taken in conjunction with the accompahying drawings, wherein like reference characters refer to similar parts throughout the several views, and in which:

BRIEF DESCRIPTION OF THE DRAWINGS

FIG. 1 is a partial perspective view of an end of a railroad car showing the telescoping uncoupling lever applied thereto, the assembly being illustrated in a position when the coupler is centered relative to the car.

FIG. 2 is an enlarged, exploded, perspective view of the uncoupling lever showing the extension bars, the sleeve and pins prior to insertion within the sleeve.

DESCRIPTION OF THE PREFERRED EMBODIMENT

Figures 3, 4, 5:
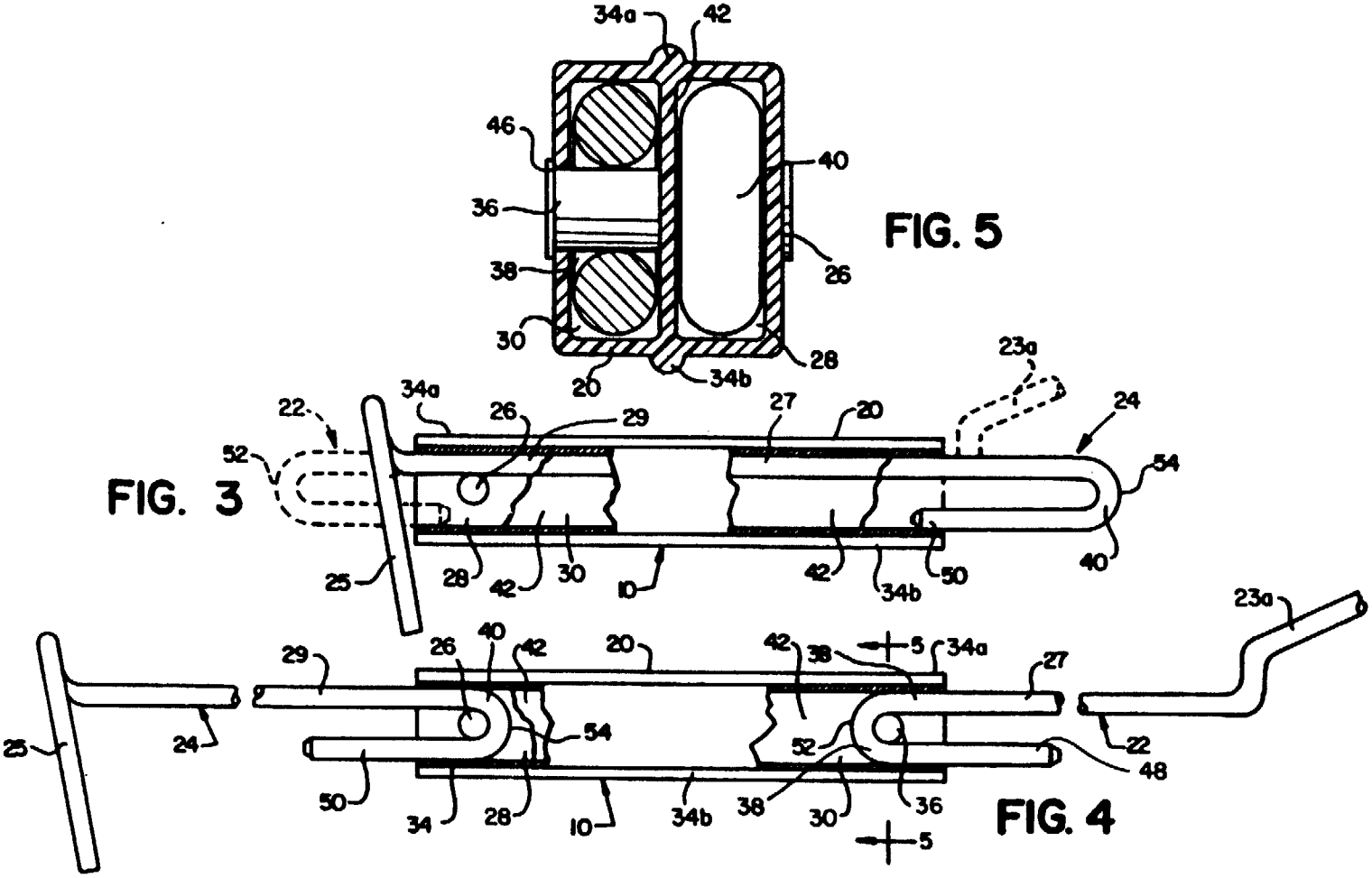
FIG. 3 is a side elevational view of the assembly of FIG. 2, with portions of the sleeve broken away to expose interior construction details along the sleeve channel for the handle extension bar, showing the extension bars in their minimum or contracted positions, with the lock lifter bar being indicated in phantom.
FIG. 4 is a side elevational view of the telescoping uncoupling level similar to FIG. 3, showing the extension bars extended to their maximum or extended positions, and with both the handle and extension bars being shown in full lines and partially broken away.
FIG. 5 is a cross-sectional view of the sleeve taken along line 5—5 on FIG. 4, looking in the direction of the arrows.

Although specific terms are used in the following description for the sake of clarity, these terms are intended to refer only to the particular structure of the invention selected for illustration in the drawings and are not intended to define or limit the scope of the invention.

Referring now to the drawings, there is shown in FIG. 1 an uncoupling lever generally designated 10 applied between the uncoupling lever bracket 14 which is conventionally affixed to the car body end sill 18 and the coupler lock lifter (not shown) which is located on the underside of the coupler 12. The shank (not shown) of the coupler 12 is secured to the car 11 for swinging movement to either side of the car center line in the usual manner.

The uncoupling lever assembly 10 comprises generally a lock lifter section or extension bar 22, a handle section or extension bar 24 and a plastic sleeve or housing 20 which preferably is fabricated of the indicated U.H.M.W. polyethylene by the extrusion process. The sleeve 20 is unitary or one piece in construction and is formed to include longitudinal channels. The lifter extension bar 22 includes extension length 23a that terminaes at one end (its distal end) in a hook 23 and the handle extension bar 24 terminates at its opposite end (its distal end) in a handle 25. As best seen in FIGS. 2, 3 and 4, each extension bar 22, 24 is unitary or one piece in construction and has a rectilinear portion thereof positioned in sliding engagement within a separate channel 28, 30 in the sleeve 20. Each extension bar terminates at its other end (its proximal end) in a respective, integral, U-shaped bend or retainer 38, 40, The configuration of the sliding rectilinear portions of bars 22, 24 and the channels 28, 30 which are extruded or otherwise formed in the sleeve 20 are complementary so that the extension bars 22, 24 can slide freely within the channels. As external forces cause the car coupler 12 to swing toward or away from the uncoupling lever bracket 14, the steel extension bars 22, 24 will telescope, sliding into or out of the sleeve 20, in opposite directions relative to each other. It is noteworthy that the sleeve 20 is movable relative to both the extension bar 22 and the extension bar 24 and the sliding construction facilitates full telescoping adjustment of the uncoupling lever from a minimum length of thirty-seven inches to a maximum length of eighty-one inches.

Still referring to FIGS. 2, 3 and 4, the sleeve 20 is preferably fabricated by extruding U.H.M.W. polyethylene in a known manner to a generally hollow, rectangular configuration having the outboard and inboard ends thereof at the left and right hand ends of same, as the sleeve 20 is shown in FIGS. 1 and 2. A vertical rib or interior position 42 subdivides the defined interior space into a pair of horizontally spaced receiving channels 28, 30 which channels extend longitudinally throughout the length of the sleeve. The channels 28, 30 are shaped to recieve loosely the U-shaped bent ends 38, 40 of each the steel extension bars 22, 24 in sliding arrangement therewithin. If so desired, during the extrusion process, the sleeve may be provided with optional upper and lower longitudinal ribs 34a, 34b for added structural strength.

The lock lifter extension bar 22 and the handle extension bar 24 are preferably conventionally formed of steel bar stock of suitable strength, such as one inch diameter 1020 steel, and are bent into the desired configuration. The extension bar 22 and the extension bar 24 respectiely terminate at their facing proximal ends in a one hundred and eighty degree bent retainers 38, 40. The retainers 38, 40 function to engage the sleeve pins 26, 36 which are positioned through the channels 28, 30 to prevent the respective extension bars from being pulled free of the sleeve when the lever assembly is fully extended. See FIG. 4. The exact cross-sectional shape of the channels 28, 30 is not critical to the functioning of the invention, providing the configuration chosen permits each extension bar 22, 24 to freely slide within its respective channel. Each bent retainer is formed to define its own free end length 48, 50 that is parallel to and spaced from its respective extension bar shaft 27, 29 and provides sliding stability of the extension bars within the sleeve channels 28, 30 without permitting rotation of the parts. Thus, the free end lengths 48, 50 are respectively in torque transmitting relation to the sleeve 20, within their respective channels 28, 30, and remain so for all positions of the lever sections 22 and 24 relative to sleeve 20 between the minimum and maximum extended relations thereof relative to sleeve 20 (see FIGS. 3 and 4).

It will be noted from FIGS. 2, 3 and 4 that the extension bars 22, 24 are unitary in construction and require no welding, thereby saving manufacturing costs. The bent retainers 38, 40 retain the extension bars 22, 24 within the sleeve channels 28, 30 and are shaped to maintain each extension bar in a position parallel to the walls of the sleeve, thereby insuring that the bars will slide freely within the sleeve. This particular orientation is best seen in FIG. 5. By designing the height of each bent retainer 38, 40 roughly equivalent to the height of a channel 28, 30, the extension bar shafts 27, 29 will be held parallel to the walls of the channels 28, 30, and the bent retainers 38, 40 will be in the correct position to engage the pins 26, 36 upon maximum bar extension, See FIG. 4. Thus, retainer 38 and its shaft 27 is in substantially coplanar relation with sleeve channel 28, while retainer 40 and its shaft 29 are in substantially coplanar relation to the sleeve channel 30 (see FIG. 5).

Referring particularly to FIG. 2, assembly of the uncoupling lever 10 can be described. After the sleeve 20 is extruded to the indicated shape and length, one hole 44, 46 is drilled or otherwise provided in each channel 28, 30 at opposite ends of the sleeve on opposite sides. After the holes are formed, the bent end or retainer 38, 40 of each extension bar 22, 24 is inserted into a channel 28 or 30 through the sleeve end opening 28a, 30a nearest the hole 44, 46. Each extension bar 22, 24 is inserted within a channel 28 or 30 for a distance approximately equal to the length of the free end 48, 50 to assure that the retainer closed bend 52, 54 is positioned inwardly of the associated hole 44 or 46. With the external bars so positioned, plastic pins 26, 36 are seated permanently into the holes 44, 46 by creating a frictional bond with the sleeve, for example by spinning. Once the pins 26, 36 are inserted and set, the extension bars 22, 24 become permanently housed within the sleeve 20. Separation of the parts is prevented, either by the engagement of a bent retainer 38, 40 and pin 26, 36 (FIG. 4) at one end, or by the bent hook 23 or by the bent handle 25, at the other end. See FIG. 3.

The telescopic expansion and contraction of the assembly 10 during coupler side swing can be seen best in FIGS. 3 and 4 when considering the position of the coupler 12 relative to the uncoupling lever bracket 14. On expansion of the assembly, the lock lifter extension bar 22 will slide within its channel 28. When the bar 22 reaches its full extension, the bent retainer 38 engages the pin 26 which is located in the channel 28 near the end of the sleeve 20, thereby preventing further extension. The action of the handle extension bar 24 in the channel 30 is identical, but in the opposite direction. Upon extension of the assembly 10, the handle extension bar 24 will slide within the sleeve 20 until the bent retainer 40 at the end at the shaft 29 contacts the pin 36 at the far end of the sleeve 20. The engagement of the pin 36 with the bent retainer 40 prevents the extension bar 24 from becoming disassociated from the sleeve 20. Further, the free end lengths 48, 50 for all positions of extension bars 22 and 24 relative to sleeve 20 between the maximum retracted and extended positions indicated in FIGS. 3 and 4, will remain in their torque transmitting relations with sleeve 20 in their respective channel 28 and 30.

It is noteworthy that the respective bent retainers 38, 40 are U-shaped in configuration and both the upper and lower portions of the "U" contact and slide over portions of the plastic sleeve 20. Accordingly, the frictional load is spread over both parts of each of the extension bars 22, 24 which are bent to define the "U" shape. The top and bottom bearing engagement between the plastic sleeve and each of the bent retainers functions to assure easy, sliding engagement during all positions of use by reducing the frictional engagement between the parts, while providing for both the indicated full telescoping adjustment of the lever assembly 10 and the necessary torque transmitting relation between its extension bars 22, 24 and its sleeve 20.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by scope of the claims appended hereto.

What is claimed is:

1. In an uncoupling lever device for a railroad car having a coupler mounted at one end thereof for side to side swinging movement and movement longitudinally of the car in response to buff and draft forces and including a lock lifter for uncoupling the coupler, with said uncoupling device including a lever assembly comprising a lock lifter section including [a hook eye portion] *means* at the distal end thereof adapted to operatively engage the lock lifter [for support by the coupler], a handle section including a handle portion at the distal end thereof adapted to be pivotally secured [to the car] to one side of the end of the car to swing about a pivot point to [move said hook eye portion to] operate said lock lifter, [for mounting the lever assembly in operative relation on the car,] and an elongate housing telescopingly receiving the proximal [end] *ends* of said [sections] *handle section and lock lifter section* in substantially parallel relation, with said [lever sections] *handle section and said lock lifter section* being in torque transmitting relation to said housing, the improvement wherein:

said housing comprises[:] an elongate sleeve defining within same and extending longitudinlly thereof a pair of channels in substantially parallel relation and each defining a slide-way surfacing therealong formed from a polymer having self-lubricating characteristics, said sleeve defining outboard and inboard ends of said housing at the respective ends of said sleeve, said [device sections] *handle section and said lock lifter section* each [comprising] *comprise* a rectilinear bar shaft integral with a U-shaped retainer *portion* at the respective proximal ends thereof, with said retainer [portions] *portion* of [each of] said [device sections] *handle section and lock lifter section* defining a U-bend and a free end length spaced laterally of and substantially paralleling the shaft thereof and extending in the direction of the distal end [thereof and below said bar shaft] thereof, with said bar shaft and said retainer portion [thereof] *of* said handle section being slidably received in one of said sleeve channels for free sliding movement longitudinally thereof with said handle portion of said handle section being movable therewith toward and away from said housing outboard end, and *with* said bar shaft and said retainer portion [thereof] of said lock lifter section being slidably received in the other of said *sleeve* channels for free sliding movement longitudinally thereof with said [hook eye portion] *engaging means* of said lock lifter section being movable therewith toward and away from said housing inboard end, a first stop pin *is* fixed across said [sleeve] one channel *of said sleeve* transversely thereof *and* adjacent the outboard end of said housing, and positioned to be disposed between the paths of movement of said [handle section] bar shaft and said free end length of [same] *said handle section* with said handle section U-bend disposed in said one [sleeve] channel inboard of said first stop pin, a second pin *is* fixed across said [sleeve] other channel *of said sleeve* transversely thereof *and* adjacent the inboard end of said housing, and positioned to be disposed between the paths of movement of said [lock lifter section] bar shaft and said free end length of [same,] *said lock lifter section* with said lock lifter section U-bend disposed in said [sleeve] other channel outboard of said second stop pin, said handle section and said lock lifter section [being] *are* proportioned lengthwise of said sleeve for positioning of, in the retracted relation of the lever *assembly, the handle portion of* said handle section [handle portion] at said outboard end of said housing, and *the engaging means of* said lock lifter section [hook eye portion] at said inboard end of said housing, with the respective *proximal ends of said* handle section and lock lifter section [free end lengths] substantially remaining in torque transmitting relation with said sleeve within their respective channels, said handle section and said lock lifter section [being] *are* proportioned lengthwise of said sleeve for positioning of, in the maximum extended relation of the lever *assembly, the retainer portion of* said handle section [retainer portion] in stopped relation with said first stop pin adjacent said outboard end of said housing and *the retainer portion of* said lock lifter section [retainer portion] in stopped relation with said second stop pin adjacent said inboard end of said housing, with the respective *proximal ends of said* handle section and lock lifter section [free end lengths] substantially remaining in torque transmitting relation with said sleeve within their respective channels, and with said [handle section] bar shaft and said free end length [thereof] *of said handle section* riding on said surfacing of said one channel lengthwise thereof for [antifrication] *friction-reduced* bearing engagement of both said [hand section] bar shaft and said free end length [thereof] thereagainst, and with said [lock lifter section] bar shaft and said free end length [thereof] *of said lock lifter section* riding on said surfacing of said other channel lengthwise thereof for [antifriction] *friction-reduced* bearing engagement of both said [lock lifter section] bar shaft and said free end length [thereof] thereagainst.

2. The improvement set forth in claim 1 [wherein] *in which*:

[said handle section] *the* bar shaft, U-bend, and free end length *of said handle section* and said one channel are in substantially coplanar relation with a first plane extending longitudinally of said housing,

[and said lock lifter section] *the* bar shaft, U-bend, and free end length *of said lock lifter section* and said other channel are in substantially coplanar relation with *a* second plane extending longitudinally of said housing, *and* said first and second planes [being] *are* in substantially parallel relation.

3. The improvement set forth in claim 1 [wherein] *in which*:

said pins are formed from a polymer having self lubricating characteristics and are bonded in fixed relation to said surfacings of the respective channels in which they are received.

4. The improvement set forth in claim 1 in which:

said handle section is of one piece bar stock construction[, and said lock lifter section is of one piece bar stock construction].

5. The improvement set forth in claim 1 *in* which:

said sleeve surfacings are formed from polyethylene of ultrahigh molecular weight characteristics.

6. The improvement set forth in claim 5 in which:

said sleeve is formed from said polyethylene and said pins are formed from said polyethylene, with said pins being spin welded to said sleeve.

*7. The improvement set forth in claim 1 in which:*

*said free end length of said retainer portion extends below said bar shaft of said handle section and said lock lifter section.*

*8. The improvement set forth in claim 1 in which:*

*said lock lifter section is of one piece bar stock construction.*

*9. In an uncoupling lever device for a railroad car having a coupler mounted for movement at one end thereof and including a lock lifter for uncoupling the coupler, with said uncoupling device including a lever assembly comprising a lock lifter section including means at the distal end thereof adapted to operatively engage the lock lifter, a handle*

*section including a handle portion at the distal end thereof adapted to be pivotally secured to the car, and an elongate housing telescopingly receiving the proximal ends of said handle section and lock lifter section in substantially parallel relation, with said handle section and said lock lifter section being in torque transmitting relation to said housing, the improvement wherein:*

*said housing comprises an elongate sleeve defining within same and extending longitudinally thereof a pair of channels in substantially parallel relation and each defining a slide-way surfacing therealong formed from a polymer having self-lubricating characteristics and adapted for friction-reduced bearing engagement of portions of said handle section and lock lifter section, said sleeve defining outboard and inboard ends of said housing at the respective ends of said sleeve,*

*said handle section and said lock lifter section each comprise a rectilinear bar shaft and a U-shaped retainer portion at the respective proximal ends thereof, with said retainer portion of said handle section and lock lifter section defining a U-bend and a free end length spaced laterally of the shaft and extending in the general direction of the distal end thereof, with said bar shaft and said retainer portion of said handle section being slidably received in one of said sleeve channels for free sliding movement longitudinally thereof with said handle portion of said handle section being movable therewith toward and away from said housing outboard end, and with said bar shaft and said retainer portion of said lock lifter section being slidably received in the other of said sleeve channels for free sliding movement longitudinally thereof with said engaging means of said lock lifter section being movable therewith toward and away from said housing inboard end,*

*a first stop pin is fixed across said one channel of said sleeve transversely thereof and adjacent the outboard end of said housing, and positioned to be disposed adjacent the paths of movement of said bar shaft and said free end length of said handle section with said U-bend disposed in said one channel inboard of said first stop pin, and*

*a second stop pin is fixed across said other channel of said sleeve transversely thereof and adjacent the inboard end of said housing, and positioned to be disposed adjacent the paths of movement of said bar shaft and said free end length of said lock lifter section with said U-bend disposed in said other channel outboard of said second stop pin.*

*10. The improvement set forth in claim 9 in which:*

*said handle section and said lock lifter section are unitary members.*

*11. The improvement set forth in claim 9 in which:*

*only a single sleeve operatively connects said lock lifter section and said handle section.*

*12. The improvement set forth in claim 11 in which:*

*said housing is formed only of said polymer.*

*13. In an uncoupling lever device for a railroad car having a coupler mounted for movement at one end thereof and including a lock lifter for uncoupling the coupler, with said uncoupling device including a lever assembly comprising a lock lifter section including means at the distal end thereof adapted to operatively engage the lock lifter, a handle section including a handle portion at the distal end thereof adapted to be pivotally secured to the car, and an elongate housing telescopingly receiving the proximal ends of said handle section and lock lifter section in substantially parallel relation, with said handle section and said lock lifter section being in torque transmitting relation to said housing, the improvement wherein:*

*said housing consists essentially of an elongate sleeve formed from a polymer having self-lubricating characteristics, and defining within said and extending longitudinally thereof a pair of channels in substantially parallel relation and each defining a slide-way surfacing therealong, said sleeve defining outboard and inboard ends of said housing at the respective ends of said sleeve,*

*said handle section and said lock lifter section each comprise a rectilinear bar shaft and a U-shaped retainer portion at the respective proximal ends thereof, with said retainer portion of said handle section and lock lifter section defining a U-bend and a free length spaced laterally of the shaft and extending in the general direction of the distal end thereof, with said bar shaft and said retainer portion of said handle section being slidably received in one of said sleeve channels for free sliding movement longitudinally thereof, and with said bar shaft and said retainer portion of said lock lifter section being slidably received in the other of said sleeve channels for free sliding movement longitudinally thereof,*

*a first stop pin is fixed across said one channel of said sleeve transversely thereof and adjacent the outboard end of said housing, and positioned to be disposed adjacent the paths of movement of said bar shaft and said free end length of said handle section with said U-bend disposed inboard of said first stop pin, and*

*a second stop pin is fixed across said other channel of said sleeve transversely thereof and adjacent the inboard end of said housing, and positioned to be disposed adjacent the paths of movement of said bar shaft and said free end length of said lock lifter section with said U-bend disposed outboard of said second stop pin.*

*14. The improvement set forth in claim 13 in which:*

*said handle section and said lock lifter section are unitary members.*

*15. An uncoupling lever device for a railroad car having a coupler mounted for movement at one end thereof and including a lock lifter for uncoupling the coupler, said uncoupling device consisting essentially of:*

*a lever assembly including a lock lifter section having means adapted to operatively engage the lock lifter at a distal end thereof, and a handle section having a handle portion at a distal end thereof, wherein said handle section and said lock lifter section have a rectilinear bar shaft and a U-shaped retainer portion at the respective proximal ends thereof,*

*an elongate housing formed entirely of a polymer having self-lubricating characteristics and defining therein a pair of longitudinally extending channels, one of which is adapted to telescopingly receive the proximal end of said handle section therein, and the other of which is adapted to telescopingly receive the proximal end of said lock lifter section therein, such that said handle section and said lock lifter section are in torque transmitting relation to said housing,*

*a first stop pin fixed across said one channel of said housing transversely thereof and positioned to receive the U-shaped retainer portion of said handle section, and*

*a second stop pin fixed across said other channel of said housing transversely thereof and positioned to receive the U-shaped retainer portion of said lock lifter section.*

*16. The uncoupling lever device set forth in claim 15 in which:*

*the retainer portions of each of said handle section and lock lifter section defines a U-bend and a free end length spaced laterally of the shaft and extending in the general direction of the distal end thereof,*

*with said bar shaft and said retainer portion of said handle section being slidably received in said one of said housing channels for free sliding movement longitudinally thereof so that the first stop pin is positioned to be disposed in the path of movement of the U-bend of said handle section, and*

*with said bar shaft and said retainer portion of said lock lifter section being slidably received in said other of said channels for free sliding movement longitudinally thereof so that the second stop pin is positioned to be disposed in the path of movement of the U-bend of said lock lifter section.*

*17. The uncoupling lever device set forth in claim 15 in which:*

*said handle section and said lock lifter section are unitary members.*

*18. An uncoupling lever device for a railroad car having a coupler mounted for movement at one end thereof and including a lock lifter for uncoupling the coupler, said uncoupling device consisting essentially of:*

*a unitary lock lifter section, one end of which includes means for operatively engaging the lock lifter and the other end of which includes a U-shaped retainer having a free end which generally faces the lock lifter engaging means,*

*a unitary handle section, one end of which includes a handle and the other end of which includes a U-shaped retainer having a free end which generally faces the handle, and*

*a single housing member having a pair of longitudinal channels in parallel spaced relation to one another, one of which receives the retainer of the lock lifter section and the other of which receives the retainer of the handle section, and means for engaging each of said retainers to retain said retainers within said channels during respective longitudinal movement of said lock lifter section, said handle section and said housing member.*

*19. The uncoupling lever device set forth in claim 18 in which:*

*the single housing member is comprised only of a polymer having self-lubricating qualities.*

*20. The uncoupling lever device set forth in claim 18 in which:*

*said retainer engaging means are stop pins fixed in position in said housing and extending across said channels so as to engage said U-shaped retainers.*

* * * * *